United States Patent Office 3,523,018
Patented Aug. 4, 1970

3,523,018
UREASE INHIBITORS
Paul R. Geissler, Metuchen, Kamil Sor, Linden, and
Theodore M. Rosenblatt, Plainfield, N.J., assignors to
Esso Research and Engineering Company, a corporation of Delaware
No Drawing. Continuation of application Ser. No.
543,792, Apr. 20, 1966. This application Jan. 8,
1969, Ser. No. 791,871
Int. Cl. C05c 9/00
U.S. Cl. 71—28
6 Claims

ABSTRACT OF THE DISCLOSURE

Improved urea fertilizer compositions are obtained through incorporation of small amounts of a urease inhibitor such as borax and/or copper sulfate, into a urea melt prior to its subsequent formation into pellets, e.g., by prilling.

---

This application is a continuation of Ser. No. 543,792, filed Apr. 20, 1966 and now abandoned.

The present invention is directed to an agricultural fertilizer composition. More particularly, the invention relates to fertilizer compositions comprising urea and an inhibitor for reducing the degree of volatilization of ammonia from the urea.

It is well known in the art to use urea and urea compounds as agricultural nutrients. The effective life of such nutrients, however, is of short duration wherever general microbiological activity exists in the soil to which the nutrient is applied. This is due to the fact that urea is hydrolyzed, and nitrogen is lost in the form of ammonia, when urea is placed under or on the surface of moist soils which contain urease. Urease, a crystallizable enzyme occurring in numerous bacteria and fungi, catalyzes the conversion of urea into ammonium carbonate which subsequently decomposes into ammonium bicarbonate and ammonia. The reactions are as follows:

$$CO(NH_2)_2 + 2H_2O \xrightarrow{urease} (NH_4)_2CO_3$$

$$(NH_4)_2CO_3 \longrightarrow NH_4HCO_3 + NH_3$$

A portion of the ammonia thus formed is held by the absorbing constituents of the soil, and the rest (up to 50%) may be lost to the air.

In order to overcome this loss of nitrogen many suggestions have been made; for example, Gaylord Volk of the Florida Agricultural Experiment Station in "Agricultural and Food Chemistry," vol. 9, No. 4, pages 280–283, 1961, reports as follows:

"Table I is an attempt to apply this principle to the current problem by dusting urea pellets with copper sulfate prior to application to the soil. According to the data obtained, significant inhibition of the urea hydrolysis appears to be impractical by this method, but further study is needed. Apparently urea diffuses out of the zone of copper effect, thereby rendering the latter ineffective. Copper is readily immobilized by soil, but urea moves freely with soil moisture or by diffusion."

Table I of Volk's report follows.

TABLE I

Effect of Copper Sulfate Dust or Gypsum on Volatile Loss of Ammonia from Pelleted Urea-Nitrogen, Surface-Applied at 100 Lbs./Acre Rate in Laboratory Tests on Moist Lakeland Fine Sand, pH 5.6

| Treatments, Urea 1 to 2 Millimeters Diameter | Replication No. | Nitrogen Loss as $NH_3$ in 7 Days, percent |
|---|---|---|
| Urea | 1 | 34.4 |
|  | 2 | 36.4 |
|  | 3 | 37.9 |
| Average |  | 36.2 |
| Urea plus 0.25% Cu by weight of urea [1] | 1 | 32.0 |
|  | 2 | 32.2 |
|  | 3 | 34.1 |
| Average |  | 32.8 |
| Urea plus $CaSO_4 \cdot 2H_2O$ at 1–1 ratio | 1 | 33.6 |
|  | 2 | 31.5 |
|  | 3 | 38.6 |
| Average |  | 34.6 |

[1] Applied as dry coating to urea pellets, 0.4% Cu was similarly ineffective.

It is thus seen that inhibitors such as copper sulfate applied as a dry coating to urea pellets do not effectively reduce the volatilization of ammonia from urea. Attempts have been made to solve this problem economically. One attempted solution comprised mixing an inhibitor with urea pellets and thereafter utilizing microcrystalline wax and asphalt as a binder. The microcrystalline wax and asphalt bind together the urea pellets that have been coated with an inhibitor. Thereafter, the material is pelletized in a suitable manner, for example, by extrusion. This is a relatively expensive procedure and is therefore unattractive for many commercial purposes.

It is an object of this invention to provide an economic method of reducing the rate of volatilization of ammonia from urea prills.

Other objects will be apparent as one reads the following disclosure.

The first object of this invention is achieved by preparing a urea pellet having a urease inhibitor dispersed, preferably uniformly, throughout the pellet. The uniform distribution can be obtained by dissolving a urease inhibitor or combination of urease inhibitors in molten urea before the molten urea is formed into a particle suitable for application to soil. This can be accomplished either by mixing the inhibitor with the urea in the solid form and thereafter melting the admixture, or by first melting the urea and then intimately admixing the inhibitor into the melt.

In the latter method the urea is heated to slightly above its melting point, preferably to a temperature of from 130° C. to 135° C., in a suitable container. The urease inhibitor is then added to the molten material in an amount sufficient to inactivate, at least partially, the urease that exists in the environment to which the fertilizer will be applied. The melt containing the inhibitor should then be stirred so that the inhibitor is dispersed, preferably uniformly, in the melt before the pellets are formed.

As has already been mentioned, however, the inhibitor and the urea can be admixed before heat is applied. Most of the inhibitors described herein will dissolve in the molten urea. However, if an insoluble inhibitor is employed, it should be finely ground before being admixed with the urea.

Pellets are then formed from the molten admixture by a suitable process. Pellets, as referred to herein, include any granule, prill, or particle which is suitable for application as a fertilizer to a given environment. The pellets can be formed by the process which is commercially known as "prilling." Pellets of approximately spherical shape, but which may have a recess on one side or may be of tear-drop formation, are prepared by dropping the molten material from a considerable height, for example, 100 feet, sufficient to allow air cooling to solidify the pellets as they fall.

The inhibitor or combination of inhibitors is incorporated into the melt in amounts of from about 0.01 to 10.0 wt. percent based upon the weight of urea. The preferred concentration is in the range of from about 0.1 to 6 wt. percent; and most preferably, the inhibitors are employed in an amount in the range of from about 0.2 to 4 wt. percent based upon the weight of urea. Other materials may be combined with urea in producing N-P-K complex fertilizers without departing from the scope of this invention. Such materials include, for example, ammonium phosphates and sulfates, potash, and normal and triple superphosphates. It is preferred, however, that these complex fertilizers contain a major amount of urea.

Ammonia losses from surface-supplied nitrogenous fertilizer is prevented in accordance with this invention by the use of a variety of urease inhibitors. Suitable inhibitors include heavy metal ions such as the ions of copper, cobalt, silver, manganese, zinc, cadmium, nickel, and lead; borides, fluorides, halogens, and cyanides such as borax, sodium fluoride, sodium bromide, and sodium cyanide; addition compounds of copper formate, copper acetate with urea; urea complexes with aliphatic primary, secondary, or tertiary amines; urea cupric cyanide; hydroxylamine; coordination complexes of urea and boron trifluoride; copper tetrafluoro-borate; sulfuric acid esters and quinones; aldehydes such as formaldehyde; urea derivatives such as the methyl, ethyl, butyl, and thio forms of urea; solid boric acid and boric oxide and alkyl or dialkyl dithio carbamates.

Copper sulfate and borax are preferred because of their low cost and effectiveness. Copper chelates, particularly the chelates of triethylene tetramine, N,N-diethylethylenediamine, and ethylenediamine can be used. It is believed that because of their neutral charge, these chelates may move through the soil at rates comparable to those of urea and therefore may be effective urease inhibitors in the soil.

Since one molecule of urease can promote the hydrolysis of almost 500,000 molecules of urea per minute at optimum conditions, urea hydrolysis in soil is rapid even at low enzyme concentrations and less than optimum conditions. Moreover, the enzyme often finds nearly optimum conditions in the soil because maximum reaction velocity occurs at a pH of about 7 to 8 and the optimum temperature is 55° C. In addition, the temperature coefficient of the reaction is approximately 2. Therefore, the rate of reaction nearly doubles with every rise in temperature of 10° C. with a range of temperatures from 10° to 55° C. The inhibitors of this invention do not significantly reduce the total amount of ammonia that is formed from the urea. The inhibitors do, however, significantly reduce the rate at which ammonia is volatilized. It would be undesirable to prevent completely the urea hydrolysis becasue such hydrolysis is necessary for the fertilizer to work in the soil. It is the overly-rapid rate of hydrolysis that causes the problem. When the rate of hydrolysis is reduced, the amount of ammonia that is lost to their air is significantly reduced. This reduced loss of ammonia results in greater yields per unit of applied fertilizer.

Growth chamber tests and volatilization tests indicate that the present invention is effective in significantly reducing the rate at which ammonia volatilizes from urea. The effect of sodium boarte addition to urea prills on the yield of oats was determined in growth chamber tests. Urea prills containing 2%, 4%, and 6% borax were compared with regular urea prills and ammonium nitrate. These materials were evaluated on a very light soil (loamy sand), with an exchange capacity of 3 milliequivalents/ 100 grams of soil and a pH of 6.4. Each nitrogenous material was applied to the soil surface and soil moisture was kept constant by additions around the edge of the pot to keep from washing the fertilizer deep below the surface. Soil moisture was maintained at 75% of the field capacity for three weeks. At the end of that period, oats were seeded and soil moisture raised to 120% of the field capacity. The crop was harvested after eight weeks of growth. The yields presented in the following table for each fertilizer are averages of several runs.

TABLE A

| Nitrogen Sources | Dry Weight of Oats, g./pot | Statistical* Significance |
|---|---|---|
| No Nitrogen | 5.57 | a |
| Urea Prills | 7.57 | b |
| Urea Prills+2% Borax | 8.97 | c |
| Urea Prills+4% Borax | 9.28 | c |
| Urea Prills+6% Borax | 12.51 | d, e |
| Ammonium Nitrate | 13.77 | e |

*Means followed by the same letter are significantly different (at 5% level) from means followed by other letters.

It is thus seen that urea prills containing borax are as effective as ammonium nitrate. It is recognized that ammonium nitrate does not lose ammonia when it is contacted with a urease enzyme; however, it is also recognized that ammonium nitrate is relatively unattractive for economic reasons.

The results in Table A indicate that the urea prills containing from 2 to 6% borax were effective in increasing the yield. The use of 6% borax resulted in a yield of 12.5 grams per pot as compared with a yield of only 7.6 grams where borax was not used as an inhibitor, and with 13.8 grams per pot when ammonium nitrate was the source of nitrogen.

Volatilization tests were also performed. Soil with a given moisture content was packed into an air-tight Lucite cylinder. The fertilizers mentioned in Table B were then each placed on the surface of a soil sample in an amount equivalent to the amounts generally applied under field conditions. Air, at a rate of about 20 milliliters per minute, was then passed into the Lucite cylinder, over the soil and into a container of sulfuric acid. The ammonia that was picked up by the air was neutralized by the sulfuric acid and periodically the acid was titrated with a sodium hydroxide solution to detremine the amount of ammonia that had been removed from the cylinder.

Copper sulfate, borax and sodium fluoride and mixtures of the same were used as inhibitors. The fertilizer pellets were prepared in accordance with this invention; that is, the urea was melted and the inhibitor was uniformly mixed therein prior to forming the fertilizer pellets. The results shown in Table B illustrate the effectiveness of the present invention. The inhibitors, especially the combination of copper sulfate and borax, effectively reduce the rate at which ammonia was lost.

TABLE B.—VOLATILIZATION TESTS

| Sample | Percent NH₃ Lost | | |
|---|---|---|---|
| | 7 Days | 14 Days | 20 Days |
| Urea (Average of several tests) | 9.7 | 32.6 | 43.3 |
| Urea+2% Copper Sulfate | 4.7, 5.0 | 19.2, 16.7 | 29.2, 23.1 |
| Urea+4% Borax | 2.5, 2.5 | 13.8, 14.3 | 24.6, 23.0 |
| Urea+1% Copper Sulfate)2% Borax | 2.7 | 12.1 | 20.3 |
| Urea+0.6% Copper Sulfate+1.4% Borax+0.33% Sodium Fluoride | 3.7, 3.3 | 15.4, 18.2 | 25.1, 30.9 |

It is thus seen that by incorporating a small amount of inhibitor into a urea melt prior to prilling, the rate at which ammonia is lost due to hydrolysis was significantly reduced. On the other hand, by merely coating a urea prillet with the same amounts of the same inhibitors, a significant decrease in the rate of volatilization is not achieved. Moreover, tests were performed comprising spreading an inhibitor, copper sulfate, on soil samples in the lucite cylinders at intervals of either 3, 10, or 17 days before the urea was applied to the soil surface. The inhibitor, applied in this fashion, had very little effect upon reducing the rate of volatilization. The method of utilizing the inhibitor of this invention was much more effective than the aforementioned method, despite the fact that the same amounts of inhibitors were employed in the aforementioned test.

Having thus described the general nature and specific embodiments of the present invention, the true scope is now pointed out by the appended claims.

What is claimed is:

1. An improved fertilizer pellet that is inhibited against rapid volatilization of ammonia which is initiated by urease, comprising urea and a urease inhibitor selected from the group consisting of copper formate-urea and copper acetate-urea.

2. An improved fertilizer pellet that is inhibited against rapid volatilization of ammonia which is initiated by urease, comprising urea and a urease inhibitor of an aliphatic amine-urea complex.

3. An improved fertilizer pellet that is inhibited against rapid volatilization of ammonia which is initiated by urease, comprising urea and a urease inhibitor of a coordination complex of urea and boron trifluoride.

4. An improved fertilizer pellet that is inhibited against rapid volatilization of ammonia which is initiated by urease, comprising urea and a urease inhibitor of an alkyl dithiocarbamate.

5. An improved fertilizer pellet that is inhibited against rapid volatilization of ammonia which is initiated by urease, comprising urea and a urease inhibitor comprising borax and copper sulfate, said urease inhibitor being uniformly distributed throughout said pellet in an amount of from about 0.1% to about 10% based upon the weight of urea.

6. An improved fertilizer pellet that is inhibited against rapid volatilization of ammonia which is initiated by urease, comprising urea and a urease inhibitor comprising hydroxylamine.

References Cited

UNITED STATES PATENTS

| 3,232,740 | 2/1966 | Sor et al. | 71—28 |
| 3,284,188 | 11/1966 | Amagasa et al. | 71—28 |

OTHER REFERENCES

Sumner, et al., Chemistry and Methods of Enzymes, 3rd ed., p. 159, Academic Press, New York, N.Y., 1953.

REUBEN FRIEDMAN, Primary Examiner

C. N. HART, Assistant Examiner

U.S. Cl. X.R.

71—64